(12) United States Patent
Powers et al.

(10) Patent No.: US 6,359,914 B1
(45) Date of Patent: Mar. 19, 2002

(54) TUNABLE PULSED NARROW BANDWIDTH LIGHT SOURCE

(75) Inventors: Peter E. Powers, Dayton, OH (US); Thomas J. Kulp, Livermore, CA (US)

(73) Assignee: University of Dayton, Dayton, OH (US)

(*) Notice: Subject to any disclaimer, the term of this patent is extended or adjusted under 35 U.S.C. 154(b) by 0 days.

(21) Appl. No.: 09/410,885

(22) Filed: Oct. 4, 1999

(51) Int. Cl.$^7$ ............................................ H01S 3/10
(52) U.S. Cl. .......................... 372/25; 372/20; 372/21
(58) Field of Search ............................ 372/20–23, 25, 372/29.02, 32, 34, 92, 93, 97

(56) References Cited

U.S. PATENT DOCUMENTS

| | | | |
|---|---|---|---|
| 4,349,907 A | * 9/1982 | Campillo et al. | 372/92 |
| 5,144,629 A | * 9/1992 | Basu | 372/20 |
| 5,579,152 A | 11/1996 | Ellingson et al. | |
| 5,663,973 A | 9/1997 | Stamm et al. | |
| 5,671,241 A | * 9/1997 | Stamm et al. | 372/20 |
| 5,751,472 A | 5/1998 | Jeys et al. | |
| 5,862,287 A | 1/1999 | Stock et al. | |

OTHER PUBLICATIONS

P.E. Powers et al., "Periodically poled lithium niobate optical parametric amplifier seeded with the narrow–band filtered output of an optical parametric generator" Optics Letters, vol. 23, No. 24, Dec. 15, 1998, pp. 1886–1888.

G.P. Banfi et al., "Travelling–wave parametric conversion of microjoule pulses with LBO" Optics Communications, 118, Jul. 15, 1995, pp. 353–359.

Sandia National Laboratories, "Broadly tunable, sensitive infrared spectrometer developed" Combustion Research Facility News, vol. 21, No. 2, Mar./Apr. 1999.

Shigame, Y.; Nishihara, H.; "LiNbO3 waveguide second harmonic–generation device phase matched with a fan–out domain–inverted grating" Optics Letters, v. 16 (6), Mar. 15, 1991, pp. 375–377.

Krause, H.J.; Daum, W; "Efficient parametric generation of high–power coherent picosecond pulses in lithium boarate tunable from 0.405 to 2.4 um" Appl. Phys. Lett. v. 60 (18) May 4, 1992, pp. 2180–2182.

Danielius, R.; Piskarskas, A.; Stabinis, A.; Banfi, G.P.; Di Trapani, P.; Righini, R.; Traveling–wave parametric generation of widely tunable, highly coherent femotosecond light pulses: J. Opt. Soc. Am. B, v.10 (11) Nov. 11, 1993, pp. 2222–2232.

Walker, D.R.; Flood, C.J.; Van Driel; H.M.; Kilohertz all solid–state picosecond lithium triborate optical parametric generator: Optics Letters, v. 20 (2), Jan 15, 1995, pp. 145–147.

(List continued on next page.)

Primary Examiner—James W. Davie
Assistant Examiner—Davienne Monbleau
(74) Attorney, Agent, or Firm—Killworth, Gottman, Hagan & Schaeff LLP

(57) ABSTRACT

A tunable pulsed narrow bandwidth light source and a method of operating a light source are provided. The light source includes a pump laser, first and second non-linear optical crystals, a tunable filter, and light pulse directing optics. The method includes the steps of operating the pump laser to generate a pulsed pump beam characterized by a nanosecond pulse duration and arranging the light pulse directing optics so as to (i) split the pulsed pump beam into primary and secondary pump beams; (ii) direct the primary pump beam through an input face of the first non-linear optical crystal such that a primary output beam exits from an output face of the first non-linear optical crystal; (iii) direct the primary output beam through the tunable filter to generate a sculpted seed beam; and direct the sculpted seed beam and the secondary pump beam through an input face of the second non-linear optical crystal such that a secondary output beam characterized by at least one spectral bandwidth on the order of about 0.1 cm$^{-1}$ and below exits from an output face of the second non-linear optical crystal.

42 Claims, 4 Drawing Sheets

OTHER PUBLICATIONS

Banfi, G.P.; Solcia, C.; Di Trapani, P.; Danielius, R.; Piskarskas, A.; Righini, R.; Torre, R.; "Traveling–wave parametric conversion of microjoule pulses With LBO" Optics Communications, v. 118, Jul. 15, 1995, pp. 353–359.

Petrov, V.; Noack, F.; "Tunable femotosecond optical parametric amplifier in the mid–infrated with narrow–bank seeding" J. Opt. Soc. Am. B, v. 12 (11), Nov. 11, 1995 pp. 2214–2221.

Meyers, L.E.; Eckhardt, R.C.; Fejer, M. M.; Byer, R.L.; "Multigrating quasi–phase matched optical parametric oscillator in periodically ploed LiNbO3" Optics Letters, v. 21 (8), Apr. 15, 1996, pp. 591–593.

Zayhowski, J.J.; "Periodically poled lithium niobate optical parametric amplifiers pumped by high–power passively Q–switched microchip lasers" Optics Letters, V. 22 (3), Feb. 1, 1997, pp. 169–171.

Powers, P. E.; Kulp, T. J.; Bisson, S. E.; "Continuous tuning of a continuous–wave periodically poled lithium niobate optical parametric oscillator by use of a fan–out grating design" Optics Letters, v. 23 (3), Jan. 1, 1998, pp. 159–161.

Banfi, G. P., et al., "Traveling–wave Parametric Conversion of Microjoules Pulses with LBO", Optics communications, vol. 118, Jul. 1995, pp. 353–359.*

Huang, F., et al., "Picosecond Optical parametric Amplification in Beta–BaB204", Journal of Quantum Electronics, vol. 30, No. 11, Nov. 1994, pp. 2601–2607.*

Bader, U., et al., "Visible Nanosecond PPLN Optical Parametric Generator Pumped by a Passively Q–switched Single Frequency Nd:YAG–laser", Cleo '99, May 1999, 9:30 am.*

* cited by examiner

TUNABLE PULSED NARROW BANDWIDTH LIGHT SOURCE

STATEMENT REGARDING FEDERALLY SPONSORED RESEARCH OR DEVELOPMENT

This invention was made with government support under Contract No. DE-AC04-94AL-85000 awarded by the United States Department of Energy. The Government has certain rights in this invention.

BACKGROUND OF THE INVENTION

The present invention relates to tunable light sources in the infrared and, more particularly, to a method and apparatus for generating continuously tunable, pulsed, narrow bandwidth light using a periodically poled lithium niobate (PPLN) optical parametric amplifier seeded with the output of a PPLN optical parametric generator.

Many applications such as remote sensing and molecular spectroscopy require broadly tunable sources in the infrared. Some of these applications have the additional constraint of needing narrow spectral bandwidth operation over the tuning range. Achieving broad tunability, narrow spectral bandwidth, and complete spectral coverage within the tuning range has been a difficult task. Systems that meet these requirements are typically complicated and have stringent operating conditions. For example, a tunable optical parametric oscillator (OPO) can cover a large wavelength range and can have a narrow spectral bandwidth at one wavelength, but it is difficult to tune this narrow spectral bandwidth effectively over a broad range.

Transform-limited picosecond pulses have been generated utilizing optical parametric generators (OPG). However, even when the output of an OPG is transform limited, its bandwidth is relatively large, limiting possible applications. For example, high resolution molecular spectroscopy at atmospheric pressures requires bandwidths of less than 0.1 $cm^{-1}$ which is orders of magnitude narrower than the transform limit of a 1 psec pulse of roughly 15 $cm^{-1}$.

Diode laser seeding of an OPG has been demonstrated as a means for generating a narrow spectral bandwidth. However, although diode laser seeding generally works well, the tuning range of such a system is limited by the tuning range of the diode laser. In addition, these types of systems require two lasers, adding cost and complexity to the overall design.

Accordingly, there is a need for a versatile and cost effective system for generating a narrow bandwidth light source that may be tuned over a broad spectral range while maintaining the narrow bandwidth over the broad tuning range.

BRIEF SUMMARY OF THE INVENTION

This need is met by the present invention wherein a scheme is provided for generating a continuously tunable, pulsed, narrow bandwidth light source using an optical parametric amplifier seeded with the output of an optical parametric generator.

In accordance with one embodiment of the present invention, a method of operating a light source is provided. The light source includes a pump laser, first and second non-linear optical crystals, a tunable filter, and light pulse directing optics. The method comprises the steps of operating the pump laser to generate a pulsed pump beam characterized by a nanosecond pulse duration and arranging the light pulse directing optics so as to (i) split the pulsed pump beam into primary and secondary pump beams; (ii) direct the primary pump beam through an input face of the first non-linear optical crystal such that a primary output beam exits from an output face of the first non-linear optical crystal; (iii) direct the primary output beam through the tunable filter to generate a sculpted seed beam; and direct the sculpted seed beam and the secondary pump beam through an input face of the second non-linear optical crystal such that a secondary output beam, preferably characterized by at least one spectral bandwidth on the order of about 0.1 $cm^{-1}$ and below, exits from an output face of the second non-linear optical crystal. The sculpted seed beam may be generated such that a plurality of distinct spectral bandwidths on the order of about 0.1 $cm^{-1}$ and below exit from an output face of the second non-linear optical crystal.

The pump laser is preferably operated such that the pulse duration is between about 1 ns and about 20 ns. The pump laser may be operated such that the pulse duration is about 15 ns. The light pulse directing optics are preferably arranged and the pump laser is preferably operated to generate a primary pump beam pump energy above a parametric threshold of the first non-linear optical crystal. The light pulse directing optics may be arranged and said pump laser may be operated to generate a primary pump beam pump energy selected to be at least twice the magnitude of the parametric threshold of said first non-linear optical crystal.

The pump laser and the first non-linear optical crystal are typically arranged such that the primary output beam comprises signal and idler components. The light pulse directing optics may be arranged so as to separate the signal and idler components of the primary output beam and direct one of the components away from the first non-linear optical crystal. The method preferably further comprises the step of arranging the light pulse directing optics so as to separate the signal and idler components of the secondary output beam and optically dump one of the components. Preferably, the light pulse directing optics are arranged such that a spot size of the sculpted seed beam on an input face of said second non-linear optical crystal is greater than a spot size of the secondary pump beam on the input face and such that the secondary pump beam spot is contained within the sculpted seed beam spot.

The tunable filter preferably comprises an etalon filter with a characteristic adjustable mirror spacing and the method preferably further comprises the step of adjusting the tunable filter by adjusting the mirror spacing. The method may further comprise the step of continuously tuning the secondary output beam over a predetermined frequency range by scanning the adjustable mirror spacing of the etalon filter. The etalon filter is preferably arranged such that the spectral bandwidth is maintained substantially constant as the output beam is tuned over the predetermined frequency range.

The light pulse directing optics are preferably arranged such that the first and second non-linear optical crystals are separated by an optical path length selected to ensure that an initial pulse of the sculpted seed beam and an initial pulse of the secondary pump beam arrive at the second non-linear optical crystal at substantially the same time. The method preferably further comprises the step of selecting respective operating temperatures and periodicities of the first and second non-linear optical crystals such that respective gain bandwidths of the first and second non-linear optical crystals overlap, whereby the sculpted seed beam falls within the gain bandwidth of the second non-linear optical crystal.

In accordance with another embodiment of the present invention, a method is provided for operating a light source.

The light source includes a pump laser, a non-linear optical crystal, a tunable filter, and light pulse directing optics. The method comprises the steps of operating the pump laser to generate a pulsed pump beam characterized by a nanosecond pulse duration and arranging the light pulse directing optics so as to: (i) split the pulsed pump beam into primary and secondary pump beams; (ii) direct the primary pump beam into the non-linear optical crystal such that a primary output beam exits from the non-linear optical crystal; (iii) direct the primary output beam through the tunable filter to generate a sculpted seed beam; and (iv) direct the sculpted seed beam and the secondary pump beam through the non-linear optical crystal such that a secondary output beam, preferably characterized by at least one spectral bandwidth on the order of about 0.1 cm$^{-1}$ and below, exits from the non-linear optical crystal. Preferably, the light pulse directing optics are arranged such that the primary pump beam is directed into the non-linear optical crystal in a first direction and the sculpted seed beam and the secondary pump beam are directed through the non-linear optical crystal in a second direction opposite the first direction.

In accordance with yet another embodiment of the present invention, a method of operating a light source is provided. The light source includes a pump laser, a broadband light source, a non-linear optical crystal, a tunable filter, and light pulse directing optics. The method comprises the steps of: (i) operating the pump laser to generate a pulsed pump beam characterized by a nanosecond pulse duration; (ii) operating the broadband light source to generate a primary output beam; and (iii) arranging the light pulse directing optics so as to direct the primary output beam through the tunable filter to generate a sculpted seed beam, and direct the sculpted seed beam and the pump beam through an input face of the second non-linear optical crystal such that a secondary output beam, preferably characterized by at least one spectral bandwidth on the order of about 0.1 cm$^{-1}$ and below, exits from an output face of the second non-linear optical crystal.

In accordance with yet another embodiment of the present invention, a tunable light source is provided including a pump laser, first and second non-linear optical crystals, a tunable filter, and light pulse directing optics. The pump laser is arranged to generate a pulsed pump beam characterized by a nanosecond pulse duration. The light pulse directing optics are arranged to (i) split the pulsed pump beam into primary and secondary pump beams; (ii) direct the primary pump beam through an input face of the first non-linear optical crystal such that a primary output beam exits from an output face of the first non-linear optical crystal; (iii) direct the primary output beam through the tunable filter to generate a sculpted seed beam; and (iv) direct the sculpted seed beam and the secondary pump beam through an input face of the second non-linear optical crystal. The pump laser, the first and second non-linear optical crystals, and the tunable filter are arranged such that a secondary output beam, preferably characterized a by at least one spectral bandwidth on the order of about 0.1 cm$^{-1}$ and below, exits from an output face of the second non-linear optical crystal.

The first non-linear optical crystal preferably comprises an optical parametric generator. The second non-linear optical crystal preferably comprises an optical parametric amplifier. The optical parametric amplifier may further comprise a wedge arranged on the output face to minimize spurious oscillations.

The light pulse directing optics preferably include (i) a first dichroic mirror positioned to separate signal and idler components of the primary output beam and direct one of the components away from the first non-linear optical crystal; and (ii) a second dichroic mirror positioned to separate signal and idler components of the secondary output beam.

The tunable filter preferably comprises an etalon filter with a characteristic controllable mirror spacing. The etalon filter may include piezoelectric elements arranged to adjust the mirror spacing. The tunable filter may comprise a plurality of etalon filters with respective characteristic controllable mirror spacings.

The light pulse directing optics are preferably arranged such that the first and second non-linear optical crystals are separated by an optical path length selected to ensure that an initial pulse of the sculpted seed beam and an initial pulse of the secondary pump beam arrive at the second non-linear optical crystal at substantially the same time.

In accordance with yet another embodiment of the present invention, a tunable light source is provided including a pump laser, a non-linear optical crystal, a tunable filter, and light pulse directing optics. The pump laser is arranged to generate a pulsed pump beam characterized by a nanosecond pulse duration. The light pulse directing optics are arranged to (i) split the pulsed pump beam into primary and secondary pump beams; (ii) direct the primary pump beam into the non-linear optical crystal such that a primary output beam exits from the non-linear optical crystal; (iii) direct the primary output beam through the tunable filter to generate a sculpted seed beam; and (iv) direct the sculpted seed beam and the secondary pump beam through the non-linear optical crystal. The pump laser, the non-linear optical crystal, and the tunable filter are arranged such that a secondary output beam, preferably characterized by at least one spectral bandwidth on the order of about 0.1 cm$^{-1}$ and below, exits from the non-linear optical crystal. The light pulse directing optics are preferably arranged to direct the primary pump beam into the non-linear optical crystal in a first direction and direct the sculpted seed beam and the secondary pump beam through the non-linear optical crystal in a second direction opposite the first direction.

Accordingly, it is an object of the present invention to generate continuously tunable, pulsed, narrow bandwidth light in the infrared using a versatile and cost effective light source. A further object of the invention is to provide a two-crystal arrangement that allows for narrow spectral bandwidths, broad tunability, and high conversion efficiency using a single nanosecond pump source. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
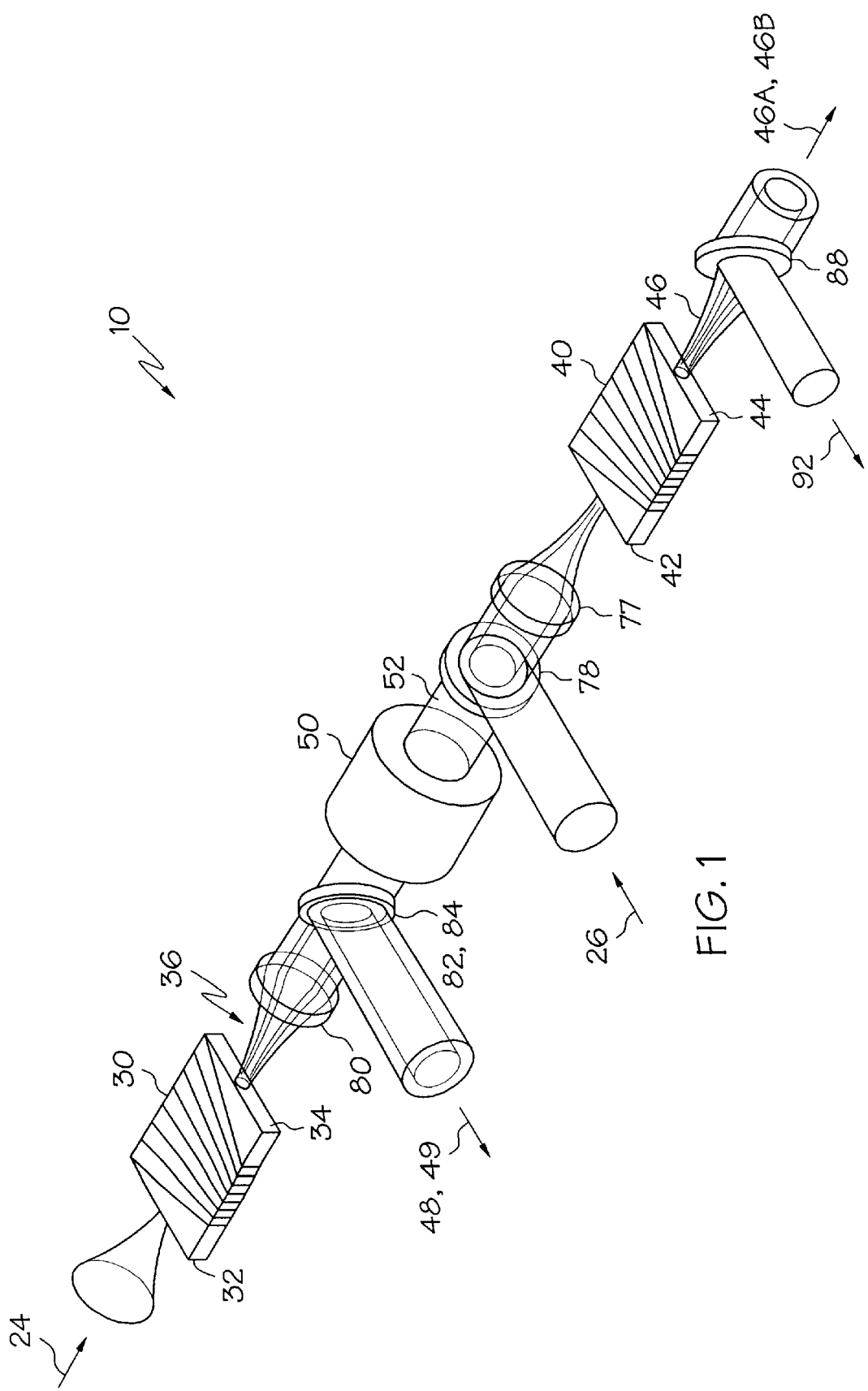
FIG. 1 is a schematic illustration of a tuning scheme according to one embodiment of the present invention.
Figure 3:
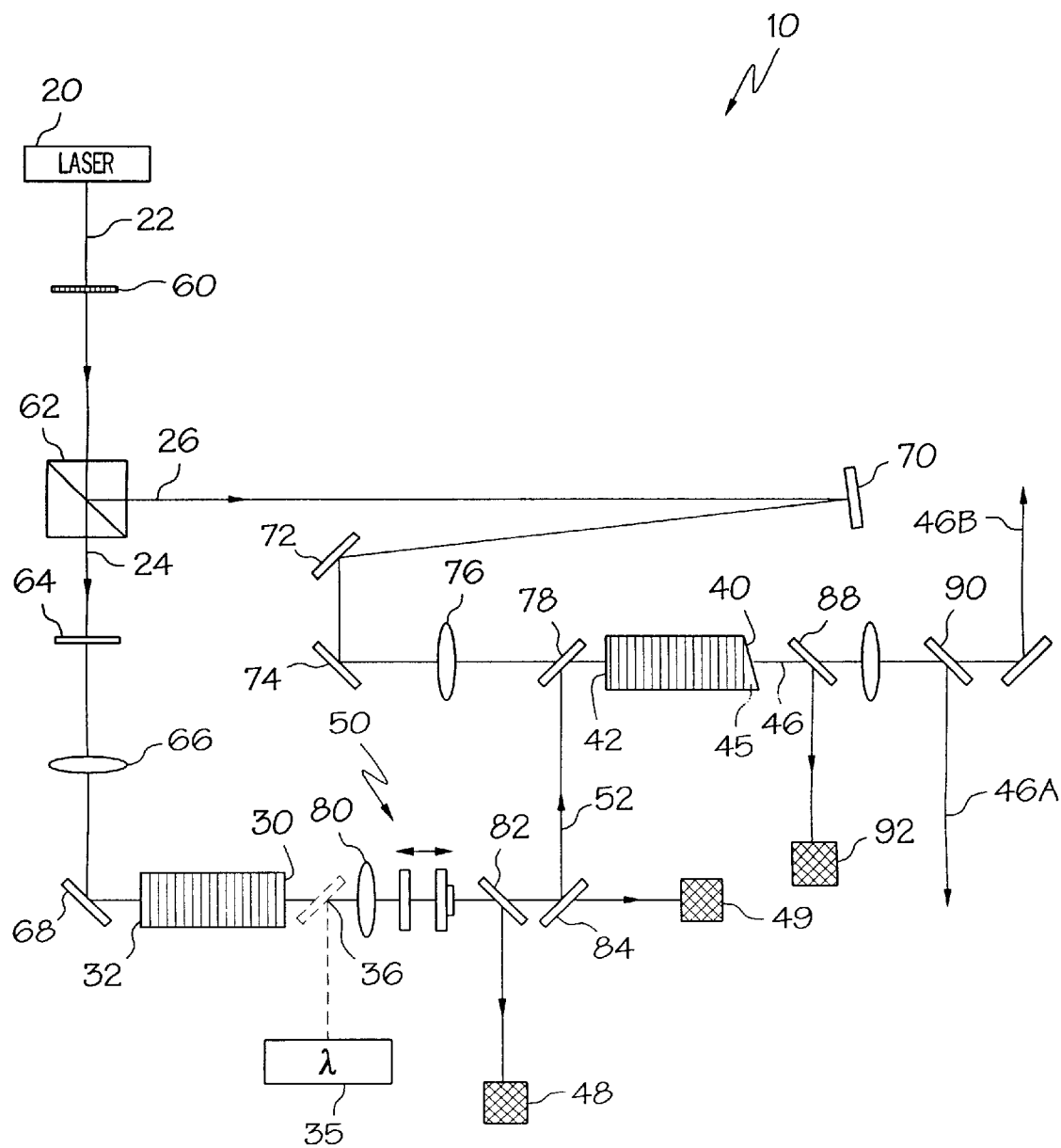
FIG. 3 is a schematic illustration of a tuning scheme according to one-embodiment of the present invention.

Referring initially to FIGS. 1 and 3, a particular embodiment of the tuning scheme of the present invention is described in detail. A tunable light source 10 according to the present invention includes a pump laser 20, a first non-linear optical crystal 30, a second non-linear optical crystal 40, and a tunable filter 50. In addition, the tunable light source 10 includes light pulse directing optics, described in further detail below.

The pump laser 20 is arranged to generate a pulsed pump beam 22 characterized by a nanosecond pulse duration. For the purposes of defining and describing the present invention, "nanosecond pulse duration" refers to pulse duration on the order of nanoseconds, as opposed to picoseconds or femtoseconds. Typically, a preferred pulse duration is between about 1 ns and 20 ns. In specific embodiments of the present invention, the pulse duration was selected to be 15 ns and 3 ns, respectively. The pump laser 20 may comprise a Nd:YAG laser operating at a repetition rate of 1 kHz and a wavelength of 1.064 $\mu$m and must have sufficient energy to drive the nonlinear process in the nonlinear crystals of the present invention, as described in detail below.

The light pulse directing optics are arranged to split the pulsed pump beam 22 into a primary pump beam 24 and secondary pump beam 26. Referring specifically to FIG. 3, the pulsed pump beam 22 passes through a half-wave plate 60 and is split by a polarizing beamsplitter 62 to produce the primary pump beam 24 and secondary pump beam 26.

The primary pump beam 24 is directed through an input face 32 of the first non-linear optical crystal 30. Referring again specifically to FIG. 3, the primary pump beam 24 passes through an additional half-wave plate 64 and a lens 66, and is reflected in the direction of the input face 32 of the first non-linear optical crystal 30 by a reflector or mirror 68. The first non-linear optical crystal 30 comprises an optical parametric generator (OPG). Accordingly, a primary output beam 36 exits from an output face 34 of the first non-linear optical crystal 30 as a result of the incidence of the primary pump beam 24. It is noted that, according to conventional knowledge in the art, optical parametric generators and optical parametric amplifiers are often structurally identical and vary only with respect to the manner in which they are employed in a particular system.

In a preferred embodiment of the present invention, the energy of the primary pump beam 24 is selected to be above the parametric threshold of the first non-linear optical crystal 30. Typically, the energy of the primary pump beam 24 is selected to be at least twice the magnitude of the parametric threshold of the first non-linear optical crystal 30. In a specific embodiment of the present invention using 15 nsec pulses, the first non-linear optical crystal 30 comprises an OPG and is characterized by a—parametric threshold of about 310 $\mu$J and the energy of the primary pump beam 24 is about 750 $\mu$J. In another embodiment of the present invention using 2 nsec pulses, the energy of the primary pump beam 24 was selected to be about 50 $\mu$J. It is contemplated that a number of applications of the tunable light source 10 of the present invention will not require maximum primary output beam energy and, as such, it may not be necessary to pump the first non-linear optical crystal 30 above its parametric threshold. The only significant constraint on the energy of the primary pump beam 24 is that the energy be great enough to cause the first non-linear optical crystal 30 to generate seed light that is sufficient to control the bandwidth of a secondary output beam 46 in the manner described below. It is also noted that in a particular embodiment of the present invention, the primary pump beam 24 was focused to have an intensity 1/e radius of 130 $\mu$m. This intensity radius and the intensity radii noted throughout the present specification are presented for purposes of illustration only and are note intended to limit the scope of the present invention.

The primary output beam 36 includes signal and idler components and a component at the wavelength of the primary pump beam 24. Typically, when using a Nd:YAG laser operating at a repetition rate of 1 kHz and a wavelength of 1.064 $\mu$m, the signal component of the primary output beam 36 is characterized by an energy of between about 10 $\mu$J and about 200 $\mu$J and a wavelength of between about 1.3 $\mu$m and about 2 $\mu$m. The energy and frequency characteristics of the idler component are a direct function of the signal component and are dictated according to the laws of energy conservation. Thus, according to the values recited above for the signal component, the idler component will typically be characterized by an energy of between about 5 $\mu$J and about 100 $\mu$J and a wavelength of between about 2 $\mu$m and about 4.7 $\mu$m. In a preferred embodiment of the present invention, the signal component of the primary output beam 36 is characterized by an energy of up to about 180 $\mu$J and a wavelength of about 1.6 $\mu$m and the idler component of the primary output beam 36 is characterized by an energy of up to about 60 $\mu$J and a wavelength of about 3.3 $\mu$m.

The secondary pump beam 26 is directed through an input face 42 of the second non-linear optical crystal 40 as an 180 $\mu$m radius spot. Referring again specifically to FIG. 3, the secondary pump beam 26 is reflected by mirrors or reflectors 70, 72, 74 and by passed through a lens 76 and dichroic mirror 78 into the second non-linear optical crystal 40. In a preferred embodiment of the present invention, the energy of the primary pump beam 24 is about 750 $\mu$J and the energy of the secondary pump beam 26 is about 600 $\mu$J. Accordingly, in this specific embodiment, the pump laser 20 is operated to generate a total pump energy of about 1350 $\mu$J. It is noted that the energy directed to the first and second non-linear optical crystals 30, 40 is dictated by the maximum energy output of the laser 20 and by the damage threshold of the first and second non-linear optical crystals 30. Further, it is contemplated by the present invention that, as an alternative to splitting the pulsed pump beam 22 and directing the primary pump beam 24 into the first non-linear optical crystal 30, the first non-linear optical crystal 30 may be replaced with a broadband light source.

The primary output beam 36 is collimated with, for example, a 25 cm focal length lens 80, and directed through the tunable filter 50 to generate a sculpted seed beam 52. Preferably, the sculpted seed beam 52 is characterized by a spectral bandwidth in the signal or idler portion of less than 0.1 cm$^{-1}$. The operation of the tunable filter 50 and its relation to tuning the secondary output beam 46 over a range of wavelengths will be described in further detail below. The seed energy depends primarily upon the energy of the primary pump beam and may be as low as about 80 $\mu$J.

As is clearly illustrated in FIGS. 1 and 3, the sculpted seed beam 52 and the secondary pump beam 26 are combined at a point in the optical path of the light source 10 following the tunable filter 50. In this manner, it is assured that the secondary pump beam 26 avoids the tunable filter 50.

Figure 2A:
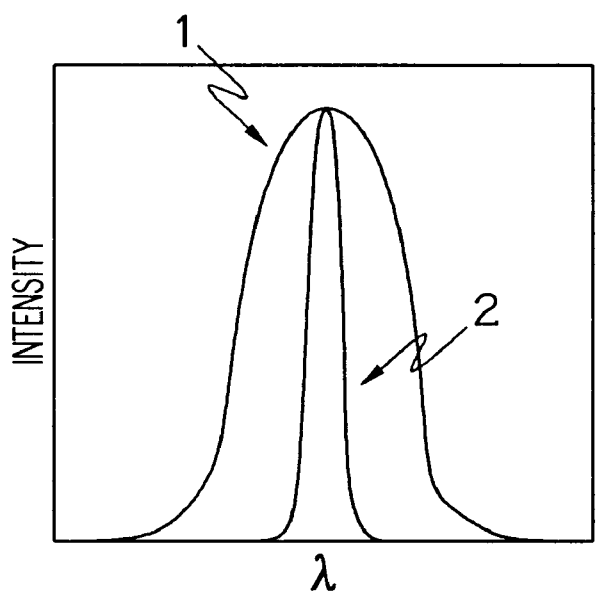
FIGS. 2A and 2B are graphic illustrations of beam intensity at various stages of the tuning scheme illustrated in FIG. 1.
Figure 2B:
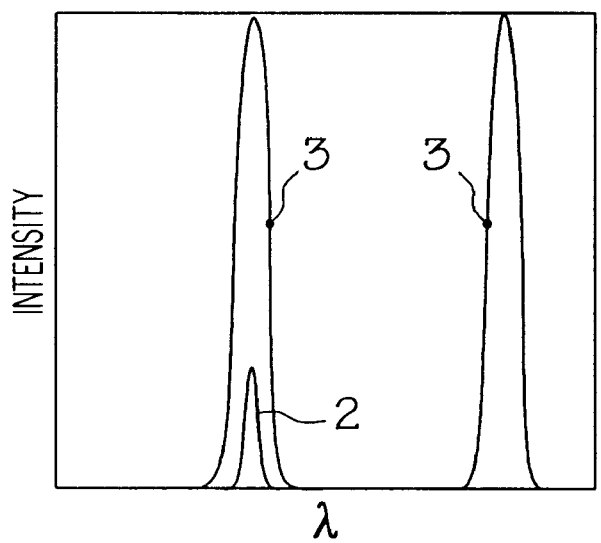

FIG. 2A graphically illustrates the intensity of the primary output beam 36 (signal or idler) just prior to passing through the tunable filter 50 (see curve 1). FIG. 2A also graphically illustrates the intensity of the sculpted seed beam 52 (see curve 2). FIG. 2B graphically illustrates the intensity of the sculpted seed beam 52 (see curve 2) and the intensity of the signal and idler portions of the secondary output beam 46 (see curve 3).

The sculpted seed beam 52 is overlapped spatially and temporarily with the secondary pump beam 26 and directed through the input face 42 of the second non-linear optical crystal 40 via dichroic mirror 78 and additional dichroic mirrors 82, 84. The first dichroic mirror 82 filters out portions of the primary output beam 36 at the wavelength of the primary pump beam 24 by directing those components to an optical dump 48. The second dichroic mirror 84 filters out an idler portion of the primary output beam 36 by directing that component to an additional optical dump 49. It is noted that the dumps 48 and 49 are not critical to the operation of the present invention and are presented herein for illustrative purposes only. The final dichroic mirror 78 directs a signal component of the sculpted seed beam 52 to the input face 42 of the second non-linear optical crystal 40 while permitting the secondary pump beam 26 to pass to the second non-linear optical crystal 40. Specifically, in one embodiment of the present invention, the signal portion of the seed beam 52 was isolated from the idler portion of the seed beam by steering the signal with two dichroic mirrors that were highly reflective at 1.5 μm and highly transmissive at 3.3 μm. As a result, only the secondary pump beam 26 and the signal component of the sculpted seed beam 52 reach the second non-linear optical crystal 40. A close comparison of FIGS. 1 and 3 illustrates the fact that the relative positions of the various optical elements in the optical path of the light source 10 of the present invention may be altered while preserving their same overall function. For example, dichroic mirrors 82 is preferably presented in the optical path before the tunable filter 50.

An additional 25 cm focal length lens 77 (see FIG. 1) is utilized to focus the sculpted seed beam on the input face 42 of the second non-linear optical crystal 40. In a preferred embodiment of the present invention, the focused spot of the sculpted seed beam 52 on the input face 42 has an intensity 1/e radius of 200 μm. It is important to note that the spot size of the sculpted seed beam 52 must be greater than the spot size of the secondary pump beam 26 and that the spot of the secondary pump beam 26 must be contained within the spot of the by sculpted seed beam 52 to avoid output of unseeded pump energy. It is contemplated that, according to certain embodiments of the present invention, that either the signal or idler component of the sculpted seed beam 52 may be directed to the second non-linear optical crystal 40 provided that the tunable filter 50 is engineered to sculpt the component (signal or idler) directed to the second non-linear optical crystal 40.

It is important to note that the light pulse directing optics are arranged such that the first and second non-linear optical crystals 30, 40 are separated by an optical path length that is selected to ensure that an initial pulse of the sculpted seed beam 52 and an initial pulse of the secondary pump beam 26 arrive at the second non-linear optical crystal 40 at substantially the same time. Further, the phase matching parameters of the first and second non-linear optical crystals are selected such that the respective gain bandwidths of the first and second non-linear optical crystals 30, 40 overlap. In this manner, the sculpted seed beam 52 may be tuned to fall within the gain bandwidth of the second non-linear optical crystal 40. Specifically, for PPLN crystals, the respective operating temperatures of the first and second non-linear optical crystals 30, 40 are selected to be above 90° C. Operation above 90° C. compensates for photorefractive damage to the PPLN crystal. Photorefractive damage may not be an issue for other crystal materials or for certain types of PPLN crystals, e.g., magnesium doped PPLN crystals and photorefractive compensated PPLN crystals.

For an embodiment of the present invention utilizing PPLN crystals, the periodicity of the first non-linear crystal was selected to be about 29.75 μm and the periodicity of the second non-linear crystal 40 was selected to be between about 29.7 μm and about 30.1 μm. The specific periodicities utilized according to the present invention depend upon the wavelength of interest and the material selected for the crystal.

The second non-linear optical crystal 40 comprises an optical parametric amplifier (OPA). Accordingly, the pump laser 20, the first and second non-linear optical crystals 30, 40, and the tunable filter 50 may be arranged to generate, at an output face 44 of the second non-linear optical crystal 40, a secondary output beam 46 characterized by a narrow spectral bandwidth and including signal and idler portions. The spectral bandwidth of the signal portion of the secondary output beam 46 matches the spectral bandwidth of the signal portion of the sculpted seed beam 52. For example, in specific embodiments of the present invention, this bandwidth was on the order of about 0.1 $cm^{-1}$ and below and was often as low as 0.06 $cm^{-1}$. Where the idler portion of the sculpted seed beam 52 is directed to the second non-linear optical crystal 40, the spectral bandwidth of the idler portion of the secondary output beam 46 will match the spectral bandwidth of the idler portion of the sculpted seed beam 52. As will be described in further detail below, the signal or idler portions of the secondary output beam 46 may be tuned over a predetermined frequency range of at least about 25 $cm^{-1}$. For the purposes of describing and defining the present invention, a spectral bandwidth on the order of about 0.1 $cm^{-1}$ and below excludes bandwidth values of about 1 $cm^{-1}$ and above.

It is contemplated by the present invention that the tunable filter 50 may be arranged such that the sculpted seed portion defines two or more distinct narrow bandwidth spectral peaks. In this manner, the secondary output beam 46 may be generated to include two or more distinct spectral bandwidths on the order of about 0.1 $cm^{-1}$ and below.

As will be described in further detail below with reference to the operation of the tunable filter 50, the secondary output beam 46 may be tuned over a range of wavelengths. An additional dichroic mirror 88 filters out portions of the secondary output beam at the wavelength of the sculpted seed beam 52 by directing those components to an optical dump 92. A further dichroic mirror 90 separates the signal 46A and idler 46B portions of the secondary output beam 46, either of which may be used as a narrow spectral bandwidth tuned light source.

In specific embodiments of the present invention, the signal component of the secondary output beam 46 is characterized by an energy of between about 1 μJ and about 500 μJ and a wavelength of between about 1.3 μm and about 2 μm (1.064 μm pump). As is noted above, the energy and frequency characteristics of the idler component are a direct function of the signal component and are dictated according to the laws of energy conservation. In a specific preferred embodiment of the present invention, the signal component of the secondary output beam is characterized by an energy of up to about 180 μJ and a wavelength of about 1.57 μm and the idler component of the secondary output beam is characterized by an energy of up to about 60 μJ and a wavelength of about 3.3 μm. In a further specific embodiment of the present invention, the second non-linear optical crystal 40 is pumped by a 275 μJ secondary pump beam to generate 17 μJ of signal and 6 μJ of idler.

As is noted above, the first non-linear optical crystal 30 comprises an optical parametric generator (OPG) and the second non-linear crystal 40 comprises an optical parametric amplifier (OPA). In one embodiment of the present invention, the first non-linear crystal comprised a single periodicity crystal of about 29.75 μm and the second non-linear optical crystal 40 comprised a fan out crystal with periodicities between about 29.7 μm and about 30.1 μm. According to one embodiment of the present invention, the second non-linear optical crystal 40 further comprises a radiation transparent wedge 45 arranged on the output face 44 of the second non-linear optical crystal 40 to minimize spurious oscillations. Typically, the wedge 45 is defined by polishing a relatively small wedge angle into the output face 44 of the second non-linear optical crystal 40.

In a preferred embodiment of the present invention, the first and second non-linear optical crystals 30, 40 comprise 5 cm long, 0.5 mm thick, and 2 cm wide PPLN crystals. The first non-linear optical crystal 30 was un-coated and the second non-linear optical crystal 40 had antireflection coatings at 1.064 and 1.57 μm. Both crystals were mounted in temperature-controlled heaters. Other non-linear optical crystals suitable for use in the present invention include birefringent phase matched crystals, quasi-phase matched GaAs crystals and zinc selenide crystals, and periodically poled RTA, KTA, CTA, and $KTiOPO_4$ crystals. Higher energy operation is possible using large aperture crystals. The PPLN crystals used for particular embodiments of the present invention had apertures of 0.5 mm. This aperture size limited the maximum fluence through the crystals. It is contemplated by the present invention that Brewster cut crystals pose a viable alternative to crystals provided with the above-described anti-reflection coatings.

In the illustrated embodiment of the present invention, the tunable filter 50 comprises a plane parallel etalon filter with a characteristic controllable mirror spacing. In a preferred embodiment of the present invention, the etalon had a maximum finesse of 450 at 1.55 μm. It is noted that more narrow bandwidth tuning should be achievable with a higher finesse etalon, provided there is enough seed energy transmitted through the etalon. The etalon filter 50 preferably includes piezoelectric elements arranged to adjust the mirror spacing to enable continuous tuning of the secondary output beam 46 over a predetermined frequency range by scanning the adjustable mirror spacing of the etalon filter 50. The spectral bandwidth is maintained substantially constant as the secondary output beam 46 is tuned over the predetermined frequency range. In certain embodiments of the present invention, particularly where a broad tuning range is required, a plurality of different tunable filters 50 are provided and selected according to the particular wavelength characteristics of the primary output beam 36. The mirror spacing of the tunable filter 50 may be electronically adjusted or scanned by coupling piezoelectric transducers to one of the etalon mirrors and piezoelectrically adjusting the position of the selected mirror. In a preferred embodiment of the present invention, the free spectral range of the etalon filter 50 was 25 $cm^{-1}$ and small changes were made to this value by adjusting the mirror spacing with the piezoelectric elements. In a preferred embodiment of the present invention, the idler portion of the secondary output beam 46 is tuned over a predetermined frequency range of about 18 $cm^{-1}$ while maintaining a spectral bandwidth of less than 0.1 $cm^{-1}$. The ability to tune over this frequency range by changing only the mirror spacing of the etalon filter 50 enables rapid tunability. With the 1-kHz repetition rate, scanning 18 $cm^{-1}$ with 0.08 $cm^{-1}$ steps takes only 225 msec. When operating with a small free spectral range, many etalon orders will be present in the sculpted seed beam 52. Accordingly, it may be necessary to provide a further filtering element, e.g., a acousto-optically tunable filter, for removal of unwanted orders.

In principle, the tuning scheme of the present invention allows for tuning across the entire infrared transparency range of a PPLN crystal (2220 to 7690 $cm^{-1}$). Specifically, although the particular tunable filter 50 selected for use with the present invention will define a relatively narrow tuning range limited to the bandwidth of the signal or idler component of the primary output beam 36, the wavelength characteristics of the respective bandwidths of the signal and idler components may be varied across the entire infrared transparency range of the first non-linear optical crystal 30 by changing other system variables, such as the temperature of the crystal, the wavelength of the pump laser, the orientation of the crystal relative to the axis of the pump laser beam, the periodicity or other engineered structure of the crystal, or the crystal material itself.

Figure 4:
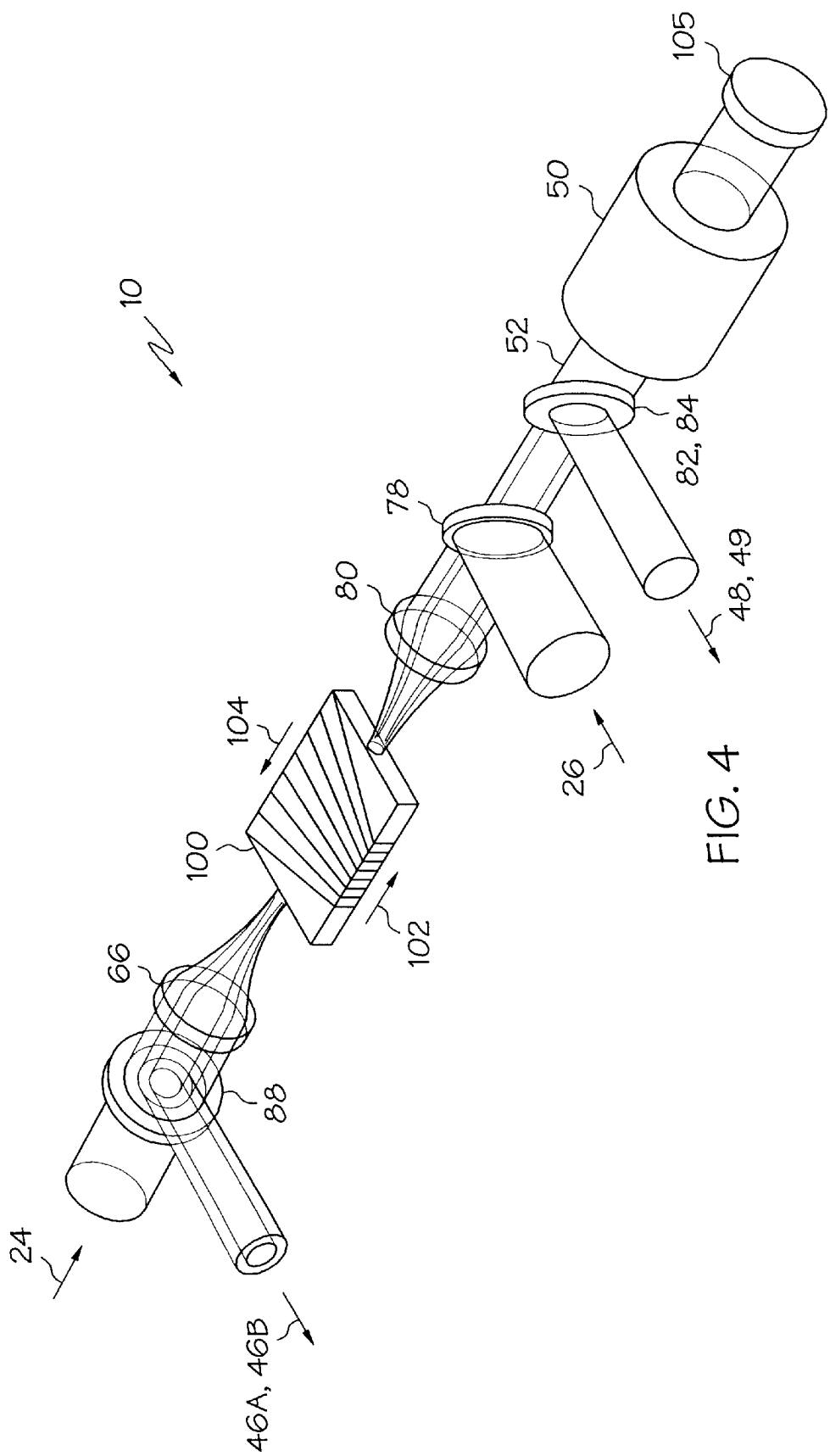
FIG. 4 illustrates a tuning scheme according to an alternative embodiment of the present invention.

The first and second non-linear optical crystals 30, 40 illustrated in FIGS. 1 and 4 comprise fan grating crystals where the periodicity along a single selected longitudinal axis of the crystal is constant but has different values along adjacent longitudinal axes of the crystal. Thus, one practicing the present invention can expand the tuning range of the light source of the present invention merely by changing the input position of the pump or seed beams on the input face of the particular crystal of interest.

Referring now to FIG. 4 in more detail, where like elements are indicated with like reference numerals, a tuning scheme according to an alternative embodiment of the present invention is illustrated. The scheme illustrated in FIG. 4 utilizes a single non-linear optical crystal 100 and a seed reflecting mirror 105 instead of the dual crystal arrangement of the previously illustrated embodiment. As can be appreciated by examining FIG. 4, this alternative scheme involves pumping the primary pump beam 24 into the non-linear optical crystal 100 in a first direction 102 and directing the sculpted seed beam 52 and the secondary pump beam 26 through the non-linear optical crystal 100 in a second direction 104 opposite the first direction 102. In this manner, the non-linear optical crystal 100 functions as an OPA and an OPG. Care must be taken to reject the reflected unfiltered light from the tunable filter 50 by, for example, tilting the filer relative to the optical axis. In addition, a delay line should be incorporated into the optical path to ensure that the sculpted seed does not compete with reflections of the pulse of light along the optical path. The tunable filter 50 and the seed reflecting mirror 105 should be separated by a distance sufficient to ensure that the seed can reenter the crystal 100 with no overlap with scattered reflections of the parametrically generated OPG pulse within the crystal 100.

It is contemplated by the present invention that additional non-linear optical crystal stages may be incorporated into the scheme of the present invention to yield further amplification of the narrow bandwidth output beam. As an alternative to providing additional non-linear crystals, the further amplification may be achieved by re-directing the output light back through the second non-linear optical crystal 40 illustrated in FIGS. 1 and 3, providing an additional pump beam source, and also directing the pump beam back through the second non-linear optical crystal 40 with the re-directed output beam. As will be appreciated by those practicing this aspect of the present invention, additional optical elements will need to be provided to separate the various components of the light and minimize spurious oscillations.

A significant advantage of the tuning scheme of the present invention is that material constraints are relaxed because there is only a single pass in each non-linear optical crystal. Accordingly, significant loss and distortion can be incurred that would otherwise be unacceptable for a multi-pass device, such as an optical parametric oscillator. Another advantage of the OPG/OPA arrangement is that no longitudinal mode structure is preset, permitting smooth, continuous tuning. The simple tuning characteristics of the OPG/OPA apparatus of this invention make this device an attractive source for experiments requiring broad, continuous tuning.

Having described the invention in detail and by reference to preferred embodiments thereof, it will be apparent that modifications and variations are possible without departing from the scope of the invention defined in the appended claims. In addition, it is noted that the tunable light source of the present invention is suitable for any of a number of applications, including remote sensing, molecular spectroscopy, cavity ringdown spectroscopy, medical applications, etc. A number of laser pump sources in addition to the Nd:YAG laser source noted above, may be utilized in practicing the present invention. Similarly, the present invention is not limited to the use of an etalon filter. Indeed, other filter types, including acousto-optical tunable filters and diffraction gratings, may be utilized according to the present invention. Finally, it is noted that the tuning scheme of the present invention is likely to be well-suited for applications involving quasi-phase-matched materials such as GaAs stacks.

What is claimed is:

1. A method of operating a light source including a pump laser, first and second non-linear optical crystals, a tunable filter, and light pulse directing optics, said method comprising the steps of:
    operating said pump laser to generate a pulsed pump beam; and
    arranging said light pulse directing optics so as to
       split said pulsed pump beam into primary and secondary pump beams,
       direct said primary output beam originating from said pulsed pump beam through said tunable filter to generate a sculpted seed beam from said pulsed pump beam, and
       direct said sculpted seed beam and said secondary pump beam through an input face of said second non-linear optical crystal such that a secondary output beam exits from an output face of said second non-linear optical crystal.

2. A method of operating a light source as claimed in claim 1 wherein said sculpted seed beam is generated such that said secondary output beam is characterized by at least one spectral bandwidth on the order of about 0.1 cm$^{-1}$ and below.

3. A method of operating a light source as claimed in claim 1 wherein said sculpted seed beam is generated such that a plurality of distinct spectral bandwidths exit from an output face of said second non-linear optical crystal.

4. A method of operating a light source as claimed in claim 1 wherein said pump laser is operated such that said pulse duration is between about 1 ns and about 20 ns.

5. A method of operating a light source as claimed in claim 1 further comprising the step of tuning said secondary output beam over a predetermined frequency range by tuning said tunable filter.

6. A method of operating a light source as claimed in claim 1 further comprising the step of tuning said secondary output beam by changing a system variable selected from the following group: crystal temperature, pump laser wavelength, crystal orientation, crystal periodicity, crystal material, and combinations thereof.

7. A method of operating a light source as claimed in claim 1 wherein said first and second non-linear optical crystals comprises fan grating crystals, and wherein said method further comprises the step of tuning said secondary output beam by changing a position of incidence of light on respective input faces of said crystals.

8. A method of operating a light source as claimed in claim 1 wherein said tunable filter comprises an etalon filter with a characteristic adjustable mirror spacing and wherein said method further comprises the step of adjusting said tunable filter by adjusting said mirror spacing.

9. A method of operating a light source as claimed in claim 1 wherein said tunable filter comprises an etalon filter with a characteristic adjustable mirror spacing and wherein said method further comprises the step of continuously tuning said secondary output beam over a predetermined frequency range by scanning said adjustable mirror spacing of said etalon filter.

10. A method of operating a light source as claimed in claim 9 wherein said etalon filter is arranged such that said spectral bandwidth is maintained substantially constant as said output beam is tuned over said predetermined frequency range.

11. A method of operating a light source as claimed in claim 1 further comprising the step of adjusting said tunable filter such that a value of said spectral bandwidth is maintained and tuned over a predetermined range.

12. A method of operating a light source as claimed in claim 1 wherein said light pulse directing optics are arranged and said pump laser is operated to generate a primary pump beam pump energy above a parametric threshold of said first non-linear optical crystal.

13. A method of operating a light source as claimed in claim 1 wherein said light pulse directing optics are arranged and said pump laser is operated to generate a primary pump beam pump energy selected to be at least twice the magnitude of the parametric threshold of said first non-linear optical crystal.

14. A method of operating a light source as claimed in claim 1 wherein said light pulse directing optics are arranged such that a spot size of the sculpted seed beam on an input face of said second non-linear optical crystal is greater than a spot size of the secondary pump beam on said input face and such that said secondary pump beam spot is contained within said sculpted seed beam spot.

15. A method of operating a light source as claimed in claim 1 wherein said pump laser and said first non-linear optical crystal are arranged such that said primary output beam comprises signal and idler components.

16. A method of operating a light source as claimed in claim 15 wherein said method further comprises the step of arranging said light pulse directing optics so as to separate said signal and idler components of said primary output beam and direct one of said components away from said first non-linear optical crystal.

17. A method of operating a light source as claimed in claim 1 wherein said pump laser, said first non-linear optical crystal, said light pulse directing optics, and said tunable filter are arranged such that said sculpted seed beam is characterized by a seed energy of between about 80 nJ and about 3 $\mu$J.

18. A method of operating a light source as claimed in claim 1 wherein said pump laser, said light pulse directing optics, said first non-linear optical crystal, and said second non-linear optical crystal are arranged such that said secondary output beam comprises signal and idler components.

19. A method of operating a light source as claimed in claim 18 wherein said method further comprises the step of arranging said light pulse directing optics so as to separate said signal and idler components of said secondary output beam.

20. A method of operating a light source as claimed in claim 1 wherein said second non-linear optical crystal includes a wedge arranged on said output face to minimize spurious oscillations.

21. A method of operating a light source as claimed in claim 1 wherein said light pulse directing optics are arranged such that the first and second non-linear optical crystals are separated by an optical path length selected to ensure that an initial pulse of said sculpted seed beam and an initial pulse of said secondary pump beam arrive at said second non-linear optical crystal at substantially the same time.

22. A method of operating a light source as claimed in claim 1 wherein said method further comprises the step of selecting respective operating temperatures and periodicities of said first and second non-linear optical crystals such that respective gain bandwidths of said first and second non-linear optical crystals overlap, whereby said sculpted seed beam falls within said gain bandwidth of said second non-linear optical crystal.

23. A method of operating a light source as claimed in claim 1 wherein said method further comprises the step of selecting respective operating temperatures of said first and second non-linear optical crystals to compensates for photorefractive damage to said crystals.

24. A method of operating a light source as claimed in claim 1 wherein said pulsed pump beam is characterized by a nanosecond pulse duration.

25. A tunable light source including a pump laser, first and second non-linear optical crystals, a tunable filter, and light pulse directing optics, wherein:
    said pump laser is arranged to generate a pulsed pump beam;
    said light pulse directing optics are arranged to
       split said pulsed pump beam into primary and secondary pump beams,
       direct said primary pump beam through an input face of said first non-linear optical crystal such that a primary output beam exits from an output face of said first non-linear optical crystal,
       direct said primary output beam originating from said pulsed pump beam through said tunable filter to generate a sculpted seed beam from said pulsed pump beam, and
       direct said sculpted seed beam and said secondary pump beam through an input face of said second non-linear optical crystal; and
    said pump laser, said first and second non-linear optical crystals, and said tunable filter are arranged such that a secondary output beam exits from an output face of said second non-linear optical crystal.

26. A tunable light source as claimed in claim 25 wherein said tunable filter is arranged such that said secondary output beam is characterized by at least one spectral bandwidth on the order of about 0.1 cm$^{-1}$ and below.

27. A tunable light source as claimed in claim 25 wherein said first and second non-linear optical crystals comprise fan grating crystals.

28. A tunable light source as claimed in claim 25 wherein said first non-linear optical crystal comprises an optical parametric generator.

29. A tunable light source as claimed in claim 28 wherein said second non-linear optical crystal comprises an optical parametric amplifier.

30. A tunable light source as claimed in claim 29 wherein said optical parametric amplifier further comprises a wedge arranged on said output face to minimize spurious oscillations.

31. A tunable light source as claimed in claim 25 wherein said light pulse directing optics include a first dichroic mirror positioned to separate signal and idler components of said primary output beam and direct one of said components away from said first non-linear optical crystal.

32. A tunable light source as claimed in claim 25 wherein said light pulse directing optics include a second dichroic mirror positioned to separate signal and idler components of said secondary output beam.

33. A tunable light source as claimed in claim 25 wherein said tunable filter comprises an etalon filter with a characteristic controllable mirror spacing.

34. A tunable light source as claimed in claim 33 wherein said etalon filter includes piezoelectric elements arranged to adjust said mirror spacing.

35. A tunable light source as claimed in claim 25 wherein said tunable filter comprises a plurality of etalon filters with respective characteristic controllable mirror spacings.

36. A tunable light source as claimed in claim 25 wherein said light pulse directing optics are arranged such that a spot size of the sculpted seed beam on an input face of said second non-linear optical crystal is greater than a spot size of the secondary pump beam on said input face and such that said secondary pump beam spot is contained within said sculpted seed beam spot.

37. A tunable light source as claimed in claim 25 wherein said light pulse directing optics are arranged such that the first and second non-linear optical crystals are separated by an optical path length selected to ensure that an initial pulse of said sculpted seed beam and an initial pulse of said secondary pump beam arrive at said second non-linear optical crystal at substantially the same time.

38. A tunable light source as claimed in claim 25 wherein said pulsed pump beam is characterized by a nanosecond pulse duration.

39. A method of operating a light source by:
    seeding a periodically poled lithium niobate optical parametric amplifier with the output of a periodically poled lithium niobate optical parametric generator; and
    arranging light pulse directing optics such that a spot size of a sculpted seed beam output from said optical parametric generator and input to said optical parametric amplifier is greater than a spot size of a pump beam input to said optical parametric amplifier.

40. A tunable light source comprising:
    a pump laser;
    a tunable filter;
    a periodically poled lithium niobate optical parametric amplifier;
    a periodically poled lithium niobate optical parametric generator; and
    light pulse directing optics arranged such that a spot size of a sculpted seed beam originating from said pump laser, said tunable filter, and said optical parametric generator and input to said optical parametric amplifier is greater than a spot size of a pump beam input to said optical parametric amplifier.

41. A method of operating a light source including a pump laser, first and second non-linear optical crystals, a tunable filter, and light pulse directing optics arranged to define an optical path, said method comprising the steps of:

operating said pump laser to generate a pulsed pump beam; and arranging said light pulse directing optics so as to
split said pulsed pump beam into primary and secondary pump beams,
direct said primary output beam originating from said pulsed pump beam through said tunable filter to generate a sculpted seed beam from said pulsed pump beam,
combine said sculpted seed beam and said secondary pump beam at a point in said optical path following said tunable filter, whereby said secondary pump beam avoids said tunable filter, and
direct said sculpted seed beam and said secondary pump beam through an input face of said second non-linear optical crystal such that a secondary output beam exits from an output face of said second non-linear optical crystal.

42. A tunable light source including a pump laser, first and second non-linear optical crystals, a tunable filter, and light pulse directing optics, wherein:

said pump laser is arranged to generate a pulsed pump beam;

said light pulse directing optics are arranged to
split said pulsed pump beam into primary and secondary pump beams,
direct said primary pump beam through an input face of said first non-linear optical crystal such that a primary output beam exits from an output face of said first non-linear optical crystal,
direct said primary output beam originating from said pulsed pump beam through said tunable filter to generate a sculpted seed beam from said pulsed pump beam,
combine said sculpted seed beam and said secondary pump beam at a point in said optical path following said tunable filter, whereby said secondary pump beam avoids said tunable filter, and
direct said sculpted seed beam and said secondary pump beam through an input face of said second non-linear optical crystal; and said pump laser, said first and second non-linear optical crystals, and said tunable filter are arranged such that a secondary output beam exits from an output face of said second non-linear optical crystal.

* * * * *